(12) United States Patent
Jiao et al.

(10) Patent No.: US 11,913,421 B2
(45) Date of Patent: Feb. 27, 2024

(54) OCEAN WAVE ENERGY COLLECTOR BASED ON MAGNETIC FORCE AND TRIBOELECTRIC EFFECT

(71) Applicant: ZHEJIANG UNIVERSITY, Zhejiang (CN)

(72) Inventors: Pengcheng Jiao, Zhejiang (CN); Ali Matin Nazar, Zhejiang (CN); Yang Yang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 346 days.

(21) Appl. No.: 17/611,906

(22) PCT Filed: May 27, 2021

(86) PCT No.: PCT/CN2021/096233
§ 371 (c)(1),
(2) Date: Nov. 16, 2021

(87) PCT Pub. No.: WO2022/052513
PCT Pub. Date: Mar. 17, 2022

(65) Prior Publication Data
US 2022/0307458 A1  Sep. 29, 2022

(30) Foreign Application Priority Data
Sep. 11, 2020  (CN) .................. 202010953620.2

(51) Int. Cl.
*H02N 1/04* (2006.01)
*F03B 13/14* (2006.01)
*H02J 15/00* (2006.01)

(52) U.S. Cl.
CPC ............ *F03B 13/14* (2013.01); *H02J 15/003* (2013.01); *H02N 1/04* (2013.01); *F05B 2260/42* (2013.01)

(58) Field of Classification Search
CPC ......... F03B 13/14; F03B 13/20; H02J 15/003; H02J 15/00; H02N 1/04; F05B 2260/42;
(Continued)

(56) References Cited

U.S. PATENT DOCUMENTS

| 10,848,079 B2 * | 11/2020 | Ma ........................... H02N 1/08 |
| 2016/0344308 A1 * | 11/2016 | Wang ....................... H02N 1/04 |
| 2020/0067426 A1 | 2/2020 | Wang et al. |

FOREIGN PATENT DOCUMENTS

| CN | 110905712 | 3/2020 |
| CN | 111140426 | 5/2020 |

(Continued)

OTHER PUBLICATIONS

"International Search Report (Form PCT/ISA/210)"of PCT/CN2021/096233, dated Aug. 26, 2021, pp. 1-4.
(Continued)

*Primary Examiner* — Thomas Truong
(74) *Attorney, Agent, or Firm* — JCIP GLOBAL INC.

(57) ABSTRACT

The present invention belongs to the field of energy harvesting, and in particular relates to an ocean wave energy collector based on magnetic force and triboelectric effect. The ocean wave energy collector includes a plurality of protective shells connected by flexible metal spring modules; a magnetic oscillation system is installed in each protective shell in a matched mode and includes an electric energy output module and a plurality of magnetic oscillators, and each magnetic oscillator includes a first supporting body, a dielectric capsule, first magnet units, second magnet units, a supporting shell, and an electrode unit.

10 Claims, 5 Drawing Sheets

(58) Field of Classification Search
CPC .......... F05B 2260/407; F05B 2240/40; H02K 53/00
See application file for complete search history.

(56) References Cited

FOREIGN PATENT DOCUMENTS

| | | |
|---|---|---|
| CN | 111327172 | 6/2020 |
| CN | 112350443 | 2/2021 |

OTHER PUBLICATIONS

"Written Opinion of the International Searching Authority (Form PCT/ISA/237)" of PCT/CN2021/096233, dated Aug. 26, 2021, pp. 1-4.

* cited by examiner

OCEAN WAVE ENERGY COLLECTOR BASED ON MAGNETIC FORCE AND TRIBOELECTRIC EFFECT

CROSS-REFERENCE TO RELATED APPLICATION

This application is a 371 of international application of PCT application serial no. PCT/CN2021/096233, filed on May 27, 2021, which claims the priority benefit of China application no. 202010953620.2, filed on Sep. 11, 2020. The entirety of each of the above-mentioned patent applications is hereby incorporated by reference herein and made a part of this specification.

TECHNICAL FIELD

The present invention belongs to the field of energy harvesting, and in particular relates to an ocean wave energy collector based on magnetic force and triboelectric effect.

DESCRIPTION OF RELATED ART

With the increasing global warming crisis and energy crisis, the search for renewable energy has become one of the serious challenges for the sustainable development of human civilization. In recent decades, research efforts have focused on the access to clean renewable energy and on the development of renewable energy technologies. At present, nano-technology is one of the most important technologies in response to the above research needs in the new era, which, relying on the special properties of the nano-scale, provides a development idea that is different from ordinary systems, and at such microscopic scale, nano-materials and nano-particles exhibit new characteristics and behaviors that have not been observed before. In 2006, researchers used the term "nanogenerator" for the first time in the science of nanotechnology to power a specific system.

The nanogenerator provides energy for a nanometer system by using environmental and biological energy. The nanogenerator can convert mechanical energy into electric energy. The nanogenerator is mainly divided into four parts: a piezoelectric nanogenerator, a triboelectric nanogenerator, a thermoelectric nanogenerator, and a flexible electric nanogenerator. The piezoelectricity and TENG are used as the most important nanogenerator for providing micro systems. The nanogenerator is provided with two plates with different potential differences, with two electrodes placed on each plate to generate electrostatic induction (TENG). The TENG is also known as a dielectric plate, and TENG-based nanogenerators have attracted the most attention since introduction thereof. Cost effectiveness, simplicity, and unique constructions of the nanogenerators have been well proved in the field of mechanical to electrical energy conversion. At present, four basic functions are defined for the nanogenerators, including a vertical impact mode, a sliding mode, a single-electrode mode, and an independent plate mode.

In the present invention, a design is proposed by considering energy of ocean waves and for developing the renewable energy, which utilizes magnetism to generate vibration between magnetic plates and utilizes a nano-power generation concept to collect electric energy.

A problem to be solved by the present invention is to improve the oscillation efficiency, number of vibrations is increased by many times due to the presence of magnets, thus increasing the energy generated. In addition, a capsule-shaped design of a dielectric portion means that a medium portion is independent of an oscillation plate, thus no side friction exists, and the oscillation reaches the maximum value. For example, if any other design is used for generating energy, the number of vibrations is reduced due to the friction between plates attached onto the oscillation device, and thus the innovation of the present design is the application of a magnet concept and a dielectric capsule concept.

SUMMARY

To overcome the defects in the prior art, the present invention provides a technical scheme of an ocean wave energy collector based on magnetic force and triboelectric effect.

The ocean wave energy collector based on magnetic force and triboelectric effect comprises a plurality of protective shells connected by flexible metal spring modules, a magnetic oscillation system is installed in each protective shell in a matched mode and comprises an electric energy output module and a plurality of magnetic oscillators, and each magnetic oscillator comprises a first supporting body, a dielectric capsule, first magnet units, second magnet units, a supporting shell, and an electrode unit; the electrode unit is installed on the first supporting body in a matched mode, the supporting shell is installed in the electrode unit in a matched mode, the dielectric capsule is in sliding fit in the supporting shell, and the supporting shell and the dielectric capsule can generate electricity by sliding friction; the first magnet units are fixed to two ends of the dielectric capsule, the second magnet units are located at positions, corresponding to the first magnet units, at the two ends of the dielectric capsule, and the second magnet units repel the first magnet units; and the electric energy output module is used for receiving and storing electric energy generated by the magnetic oscillators.

The ocean wave energy collector based on magnetic force and triboelectric effect is provided, wherein the magnetic oscillation system further comprises a center support located at the center of the protective shell, and the electric energy output module and the magnetic oscillators are installed between the center support and the protective shell in a matched mode.

The ocean wave energy collector based on magnetic force and triboelectric effect is provided, wherein the electric energy output module and the magnetic oscillators are distributed around the top and bottom of the center support.

The ocean wave energy collector based on magnetic force and triboelectric effect is provided, wherein the first supporting body is installed between the center support and the protective shell in a matched mode, a surface of the dielectric capsule is coated with a first triboelectrification material layer, an inner wall of the supporting shell is coated with a second triboelectrification material layer corresponding to the first triboelectrification material layer, and the first triboelectrification material layer and the second triboelectrification material layer can generate electricity by friction.

The ocean wave energy collector based on magnetic force and triboelectric effect is provided, wherein the first supporting body is provided with a first slotted hole corresponding to the dielectric capsule, the electrode unit is formed by coating a conductive metal coating on the first slotted hole, the supporting shell is provided with a slot-shaped shell wall matched with the first slotted hole, and the dielectric capsule is in sliding fit in the slot-shaped shell wall.

The ocean wave energy collector based on magnetic force and triboelectric effect is provided, wherein the first supporting body and the supporting shell are each of a left-right split structure, and correspondingly, the electrode unit is also divided into two opposite poles.

The ocean wave energy collector based on magnetic force and triboelectric effect is provided, wherein the second magnet units are fixed through second supporting bodies installed between the center support and the protective shell in a matched mode.

The ocean wave energy collector based on magnetic force and triboelectric effect is provided, wherein the electric energy output module comprises a high-energy capacitor and a control circuit, a capacitor storage unit for collecting electric energy and a voltage transmission line for transmitting the electric energy collected by the capacitor storage unit to the control circuit are installed on the first supporting body and/or the supporting shell in a matched mode, and the electric energy is stored in the high-energy capacitor through the control circuit.

The ocean wave energy collector based on magnetic force and triboelectric effect is provided, wherein the protective shells are arranged in a dotted array, and the adjacent protective shells are connected by the flexible metal spring modules.

The ocean wave energy collector based on magnetic force and triboelectric effect is provided, wherein each protective shell is of a spherical structure.

Compared with the prior art, the ocean wave energy collector disclosed by the present invention can improve oscillation efficiency, number of vibrations is increased by many times due to the presence of the magnets, thereby increasing energy generated. In addition, a capsule-shaped design of a dielectric portion means that a medium portion is independent of an oscillation plate, thus no side friction exists, and the oscillation reaches the maximum value. For example, if any other design is used for generating energy, the number of vibrations is reduced due to the friction between plates attached onto the oscillation device, and thus the innovation of the present invention is the application of a magnet concept and a dielectric capsule concept.

DESCRIPTION OF THE EMBODIMENTS

The present invention is further described below in conjunction with the accompanying drawings.

As shown in FIGs, an ocean wave energy collector based on magnetic force and triboelectric effect comprises a plurality of protective shells 1 connected by flexible metal spring modules 2, a magnetic oscillation system is installed in each protective shell 1 in a matched mode and comprises an electric energy output module 4 and a plurality of magnetic oscillators 3, and each magnetic oscillator 3 comprises a first supporting body 300, a dielectric capsule 304, first magnet units 305, second magnet units 302, a supporting shell 303, and an electrode unit 308; the electrode unit 308 is installed on the first supporting body 300 in a matched mode, the supporting shell 303 is installed in the electrode unit 308 in a matched mode, the dielectric capsule 304 is in sliding fit in the supporting shell 303, and the supporting shell and the dielectric capsule can generate electricity by sliding friction; the first magnet units 305 are fixed to two ends of the dielectric capsule 304, the second magnet units 302 are located at positions, corresponding to the first magnet units 305, at the two ends of the dielectric capsule 304, and the second magnet units 302 repel the first magnet units 305; and the electric energy output module 4 is used for receiving and storing electric energy generated by the magnetic oscillators 3.

Preferably, the magnetic oscillation system further comprises a center support 5 located at the center of the protective shell 1, and the electric energy output module 4 and the magnetic oscillators 3 are installed between the center support 5 and the protective shell 1 in a matched mode.

In above structure, the electric energy output module 4 and the magnetic oscillators 3 are distributed around the top and bottom of the center support 5. More specifically, the electric energy output module 4 is located at an upper end of the center support 5, and five magnetic oscillators 3 are respectively located at the front, rear, left, right, and a lower end of the center support 5.

In above structure, the first supporting body 300 is installed between the center support 5 and the protective shell 1 in a matched mode.

The above structure is further described as follows: a main body of the dielectric capsule 304 is made of silicone rubber, the surface of the dielectric capsule 304 is coated with a first triboelectric material layer, an inner wall of the supporting shell 303 is coated with a second triboelectric material layer corresponding to the first triboelectric material layer; when the dielectric capsule 304 slides in the supporting shell 303, the two triboelectric material layers can generate electric energy by friction, the first triboelectric material layer is preferably a polyimide coating, and the second triboelectric material layer is preferably a copper coating; in addition, the first triboelectric material layer and the second triboelectric material layer can select other material combinations capable of generating electricity by friction.

The above structure is further described as follows: the first supporting body 300 is provided with a first slotted hole corresponding to the dielectric capsule 304, the electrode unit 308 is formed by coating a conductive metal coating on the first slotted hole, the supporting shell 303 is provided with a slot-shaped shell wall 3030 matched with the first slotted hole, and the dielectric capsule 304 is in sliding fit in the slot-shaped shell wall 3030.

The above structure is further described as follows: the first supporting body 300 and the supporting shell 303 are each of a left-right split structure, and correspondingly, the electrode unit 308 is also divided into two opposite poles. Specifically, the electrode unit 308 is formed by the first slotted hole, the surface of the first slotted hole is coated with the conductive metal coating, due to the fact that the supporting body 300 is divided into two split structures at left and right, the conductive metal coating is similarly composed of two separate coatings, a gap is provided between the two layers of coatings, and thus the electrode unit 308 is divided into two opposite poles.

The above structure is further described as follows: the second magnet units 302 are fixed through second supporting bodies 301 installed between the center support 5 and the protective shell 1 in a matched mode.

Preferably, the electric energy output module 4 comprises a high-energy capacitor 400 and a control circuit 401, a capacitor storage unit 306 for collecting electric energy and a voltage transmission line 307 for transmitting the electric energy collected by the capacitor storage unit 306 to the control circuit 401 are installed on the supporting shell 303 in a matched mode, and the electric energy is stored in the high-energy capacitor 400 through the control circuit 401.

Preferably, the protective shells 1 are arranged in a dotted array, and the adjacent protective shells 1 are connected by the flexible metal spring modules 2 in a transverse direction and a longitudinal direction. The protective shell 1 and the center support 5 are both of a spherical structure.

Figure 7:
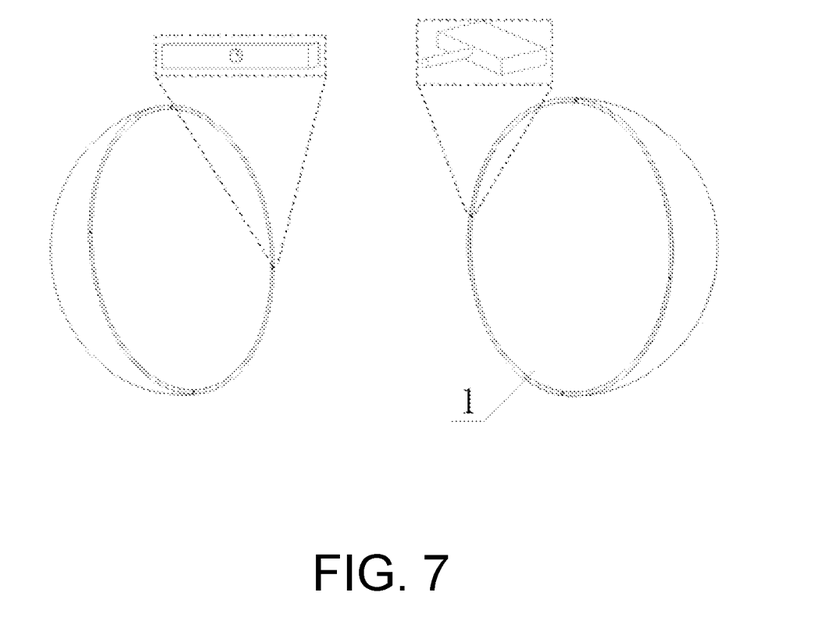
FIG. 7 is a diagram of a breakdown structure of a protective shell in accordance with the present invention.

Preferably, the protective shell 1 in the present invention is formed by connecting two split structures, wherein slots are formed in the periphery of a connecting end of one split structure, and corresponding inserting rods are arranged at a connecting end of the other split structure, and the inserting rods are matched with the slots in an inserting mode.

In the present invention, each magnetic oscillator is provided with first magnet units 305 and second magnet units 302, the magnets are arranged in mutually repulsive order to generate oscillation, the dielectric capsule 304 coated with the polyimide coating oscillates in the supporting shell 303, the supporting shell 303 is coated with the copper coating, a voltage generated by oscillation of the dielectric capsule 304 is collected by the capacitor storage unit 306 embedded into each magnetic oscillator, and then is transmitted to the control circuit 401 through the voltage transmission line 307; electric energy is stored in the high-energy capacitor 400 through the control circuit 401, and the electric energy output module 4 can output the electric energy through a communication line.

Figure 1:
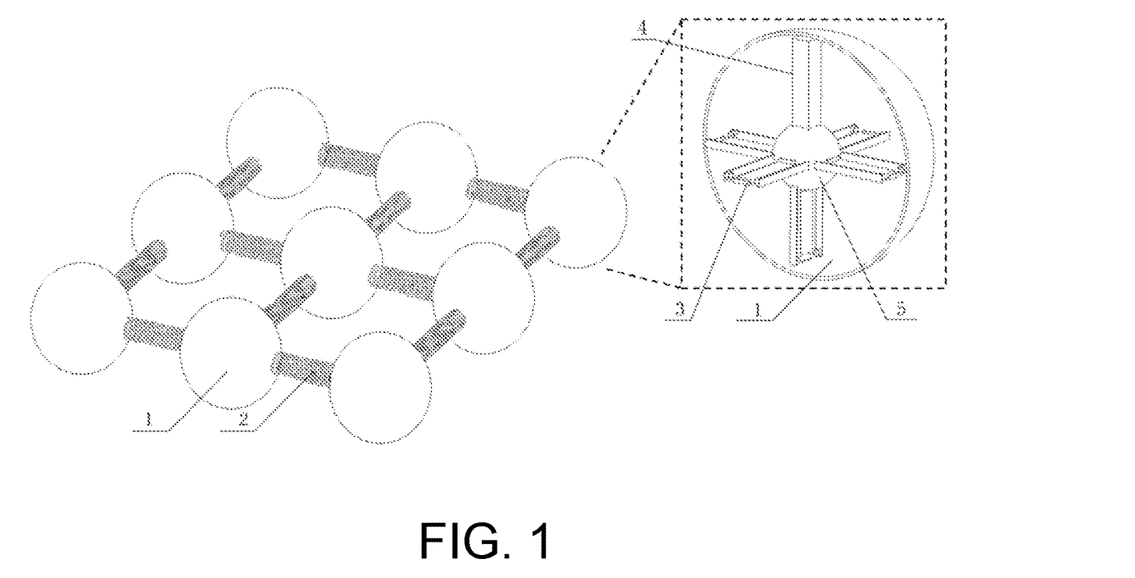
FIG. 1 is a structure diagram in accordance with the present invention.
Figure 2:
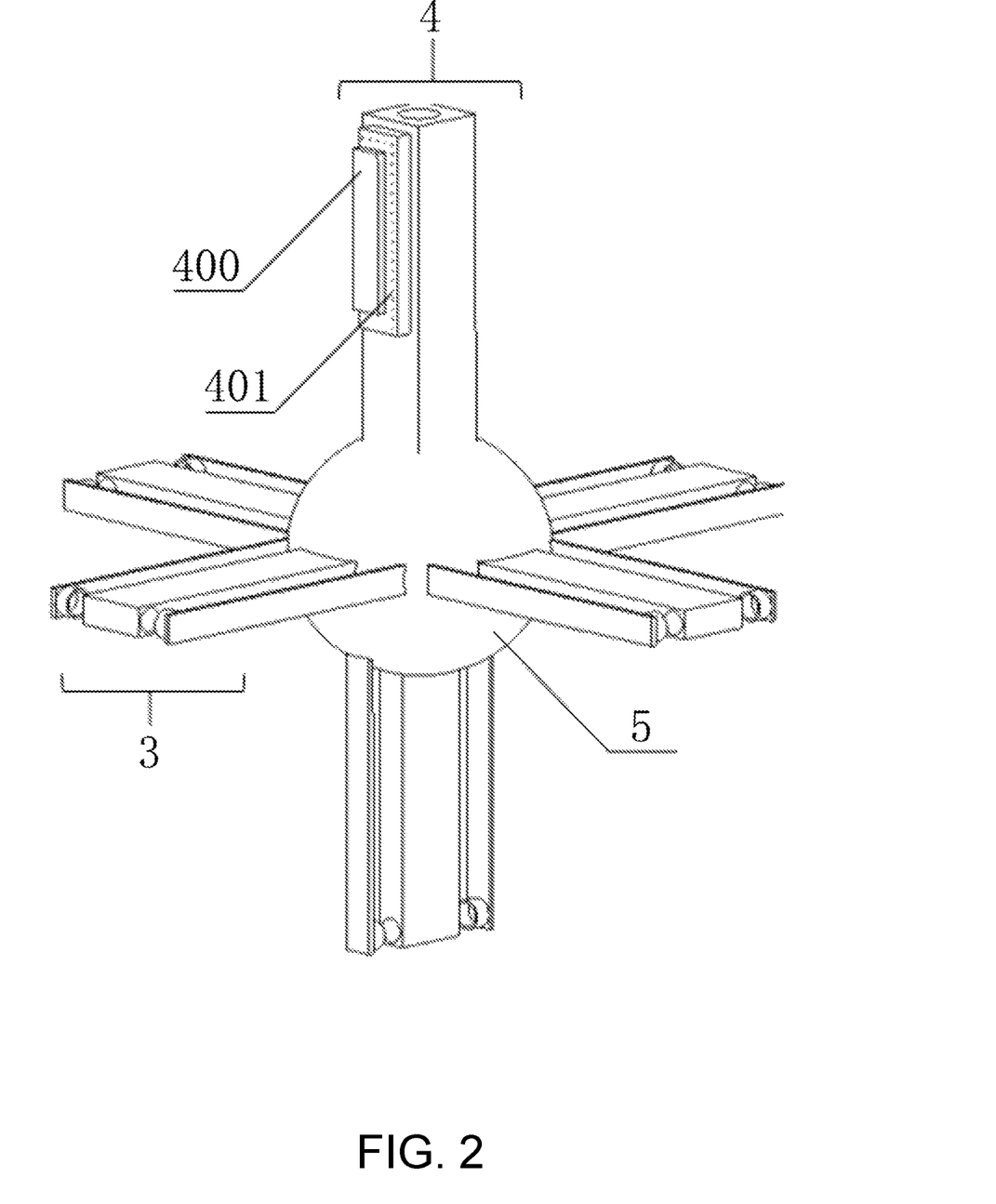
FIG. 2 is a structure diagram of a magnetic oscillation system in accordance with the present invention.
Figure 3:
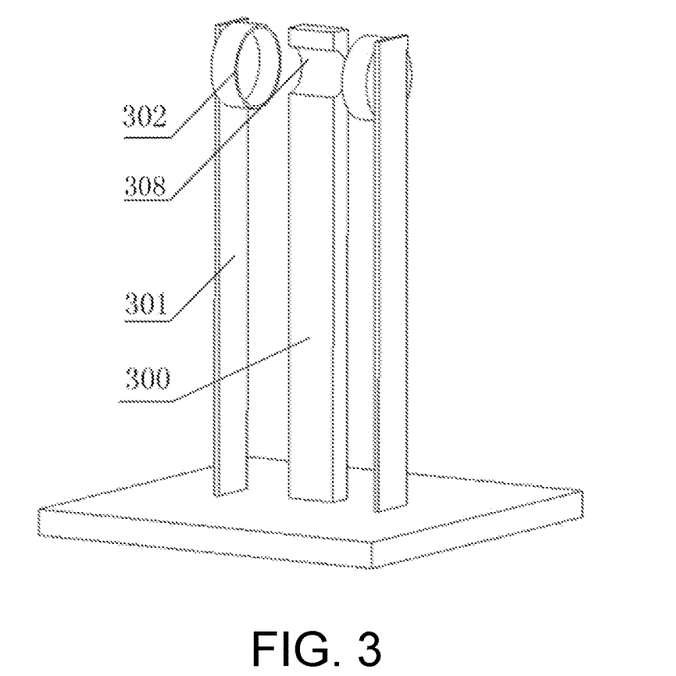
FIG. 3 is a structure diagram of a magnetic oscillator 3 in accordance with the present invention, where a dielectric capsule and a supporting shell are not shown, and only one split structure of a first supporting body is shown.
Figure 4:
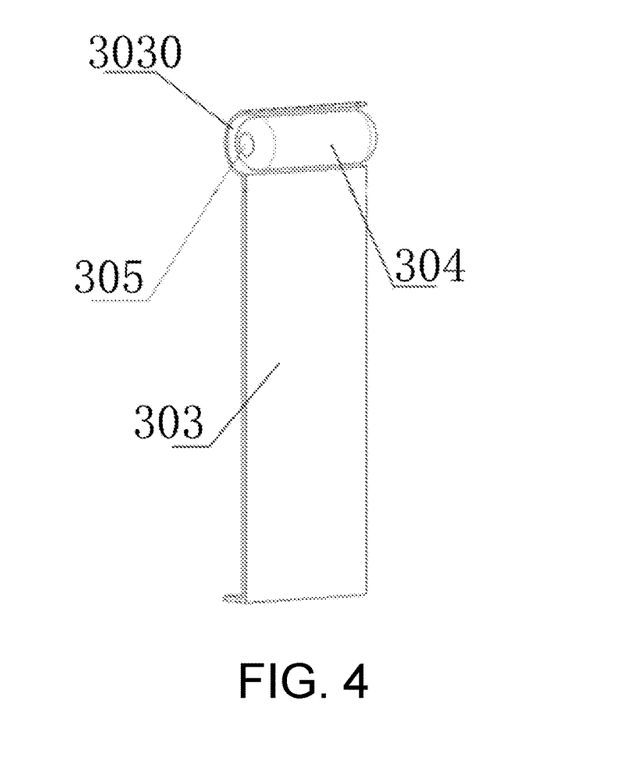
FIG. 4 is a structure diagram of connection of a supporting shell and a dielectric capsule in accordance with the present invention, wherein only one split structure of a supporting shell is shown.
Figure 5:
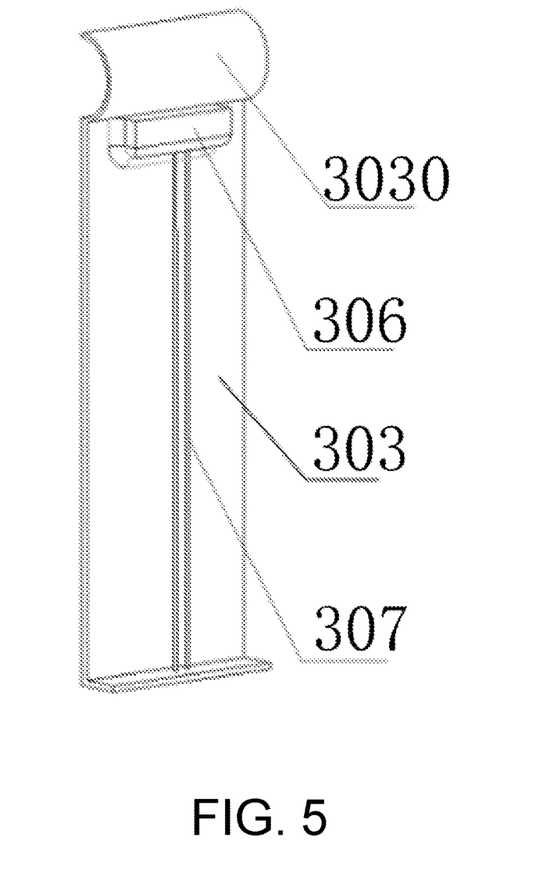
FIG. 5 is a diagram of a split structure of a supporting shell in accordance with the present invention.
Figure 6:
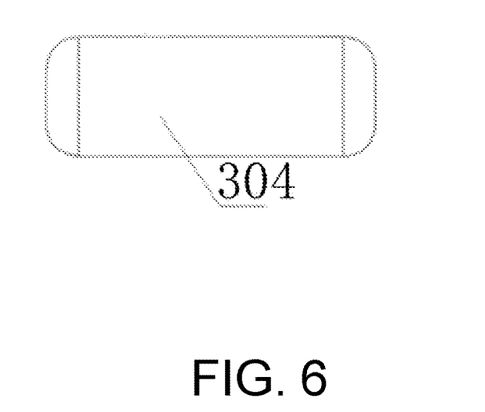
FIG. 6 is a structure diagram of a dielectric capsule in accordance with the present invention.

According to the present disclosure, the electric energy can be generated from the ocean waves, with a form of a matrix network. An overall structure of each protective shell 1 is circular, and the matrix grids are mutually connected using the flexible metal spring modules 2. An operation of the present invention is based on the principle of electromagnetism (TENG). A structure of a single oscillator 3 is shown in FIG. 2 and FIG. 3, each oscillator 3 is provided with two second magnet units 302 which are fixed using narrow second supporting bodies 301. How the magnetic oscillation works is explained as follows: the two second magnet units 302 face each other in the form of positive electrodes (the positive electrode facing the positive electrode), which means that, if one of the second magnet units moves in an X direction (in the direction of the second magnet), a fluctuation may be caused by offset, as the two magnets constantly repel each other to maintain equilibrium, and the second supporting bodies 301 naturally vibrate due to the fact that the two magnets attempt to repel each other to reach 100% equilibrium. An electrode unit and a dielectric capsule 304 are arranged between the two second magnet units 302.

In actual, the phenomenon (TENG) is based on a potential difference between an electrode plate and a dielectric plate. In the present invention, the used electrode unit is a conductive metal plating. A plated conductive metal plate consists of two separate parts: a first plated conductive metal plate is relatively close (e.g., 1 mm) to a second plated conductive metal plate. The dielectric capsule 304 of the equipment is designed as a cylindrical capsule which is made of silicone rubber. Both sides of the dielectric capsule 304 are provided with two first magnet units 305 which have opposite magnetic poles, the magnetic pole of each second magnet unit 302 is located at the front surface thereof; therefore, when the second magnet units 302 vibrate, the first magnetic units 305 vibrate in the electrode unit, and a voltage is generated due to the potential difference. The electric energy is collected by the capacitor storage unit 306, and is transmitted to the control circuit 401 through the voltage transmission line 307. Finally, the generated electric energy is stored in the high-energy capacitor 400.

Finally, it should be noted that the above embodiments are merely illustrative of the technical solutions of the present invention, and are not intended to limit the same. Although the present invention has been described in detail with reference to the foregoing embodiments, it should be understood by those of ordinary skill in the art that modification may be made to the technical solutions described in the foregoing embodiments, or equivalent replacement may be made to some or all of the technical features; however, the modifications or replacements do not make the essence of the corresponding technical solutions deviate from the scope of the technical solutions of various embodiments of the present invention

What is claimed is:

1. An ocean wave energy collector based on magnetic force and triboelectric effect, wherein the ocean wave energy collector comprises a plurality of protective shells connected by flexible metal spring modules, a magnetic oscillation system is installed in each protective shell in a matched mode and comprises an electric energy output module and a plurality of magnetic oscillators, and each magnetic oscillator comprises a first supporting body, a dielectric capsule, first magnet units, second magnet units, a supporting shell, and an electrode unit; the electrode unit is installed on the first supporting body in a matched mode, the supporting shell is installed in the electrode unit in a matched mode, the dielectric capsule is in sliding fit in the supporting shell, and the supporting shell and the dielectric capsule is capable of generating electricity by sliding friction; the first magnet units are fixed to two ends of the dielectric capsule, the second magnet units are located at positions, corresponding to the first magnet units, at the two ends of the dielectric capsule, and the second magnet units repel the first magnet units; and the electric energy output module is used for receiving and storing electric energy generated by the magnetic oscillators.

2. The ocean wave energy collector based on magnetic force and triboelectric effect according to claim 1, wherein each magnetic oscillation system further comprises a center support located at the center of the protective shell, and the electric energy output module and the magnetic oscillators are installed between the center support and the protective shell in a matched mode.

3. The ocean wave energy collector based on magnetic force and triboelectric effect according to claim 2, wherein the electric energy output module and the magnetic oscillators are distributed around the top and bottom of the center support.

4. The ocean wave energy collector based on magnetic force and triboelectric effect according to claim 2, wherein the first supporting body is installed between the center support and the protective shell in a matched mode, a surface of the dielectric capsule is coated with a first triboelectrification material layer, an inner wall of the supporting shell is coated with a second triboelectrification material layer corresponding to the first triboelectrification material layer, and the first triboelectrification material layer and the second triboelectrification material layer is capable of generating electricity by friction.

5. The ocean wave energy collector based on magnetic force and triboelectric effect according to claim 4, wherein the first supporting body is provided with a first slotted hole corresponding to the dielectric capsule, the electrode unit is formed by coating a conductive metal coating on the first slotted hole, the supporting shell is provided with a slot-shaped shell wall matched with the first slotted hole, and the dielectric capsule is in sliding fit in the slot-shaped shell wall.

6. The ocean wave energy collector based on magnetic force and triboelectric effect according to claim 5, wherein the first supporting body and the supporting shell are each of a left-right split structure, and correspondingly, the electrode unit is also divided into two opposite poles.

7. The ocean wave energy collector based on magnetic force and triboelectric effect according to claim 2, wherein the second magnet units are fixed through second supporting bodies installed between the center support and the protective shell in a matched mode.

8. The ocean wave energy collector based on magnetic force and triboelectric effect according to claim 1, wherein the electric energy output module comprises a high-energy capacitor and a control circuit, a capacitor storage unit for collecting electric energy and a voltage transmission line for transmitting the electric energy collected by the capacitor storage unit to the control circuit are installed on the first supporting body and/or the supporting shell in a matched mode, and the electric energy is stored in the high-energy capacitor through the control circuit.

9. The ocean wave energy collector based on magnetic force and triboelectric effect according to claim 1, wherein the protective shells are arranged in a dotted array, and adjacent protective shells are connected by the flexible metal spring modules.

10. The ocean wave energy collector based on magnetic force and triboelectric effect according to claim 1, wherein each protective shell is of a spherical structure.

* * * * *